United States Patent [19]
Muto et al.

[11] Patent Number: 5,281,498
[45] Date of Patent: Jan. 25, 1994

[54] SHEET-LIKE SEPARATOR AND VALVE REGULATED LEAD ACID BATTERY

[75] Inventors: Junji Muto; Hironori Kitawaki; Shoji Sugiyama; Yasuhide Nakayama; Katsumi Kitagawa; Kenjiro Kishimoto, all of Osaka, Japan

[73] Assignees: Nippon Sheet Glass Co., Ltd.; Yuasa Battery Co., Ltd., both of Osaka, Japan

[21] Appl. No.: 883,197

[22] Filed: May 14, 1992

[30] Foreign Application Priority Data

May 23, 1991 [JP] Japan ............................ 3-118526
Jun. 3, 1991 [JP] Japan ............................ 3-131114

[51] Int. Cl.$^5$ ............................................. H01M 2/16
[52] U.S. Cl. ................................. 429/247; 429/252
[58] Field of Search ..................... 429/247, 252, 145

[56] References Cited

U.S. PATENT DOCUMENTS 4,908,282  3/1990  Badger ........................ 429/252 X
5,075,184  12/1991  Tanaka et al. ................ 429/252 X

FOREIGN PATENT DOCUMENTS

| 80-5813 | 2/1980 | Japan | 429/252 |
| 60-225352 | 11/1985 | Japan | 429/252 |
| 61-269852 | 11/1986 | Japan . |
| 62-133668 | 6/1987 | Japan . |
| 62-133669 | 6/1987 | Japan . |
| 62-136751 | 6/1987 | Japan . |
| 62-281263 | 12/1987 | Japan . |
| 63-27826 | 6/1988 | Japan . |
| 63-143742 | 6/1988 | Japan . |
| 63-146348 | 6/1988 | Japan . |
| 63-152853 | 6/1988 | Japan . |
| 2-22654 | 9/1990 | Japan . |
| WO-A8803710 | 5/1988 | PCT Int'l Appl. . |

*Primary Examiner*—Stephen Kalafut
*Attorney, Agent, or Firm*—Kanesaka and Takeuchi

[57] ABSTRACT

A sheet-like separator has an electrolyte dripping speed of 100 mm/hr or less, wherein the values of repellent force on the pouring repellent force curve of pouring of dilute sulfuric acid shown in FIG. 1 are the following:

if point S = P kg/dm$^2$,
point B ≧ 0.55P kg/dm$^2$
point C ≧ 0.40P kg/dm$^2$

A valve regulated lead acid battery employs the separator.

24 Claims, 2 Drawing Sheets

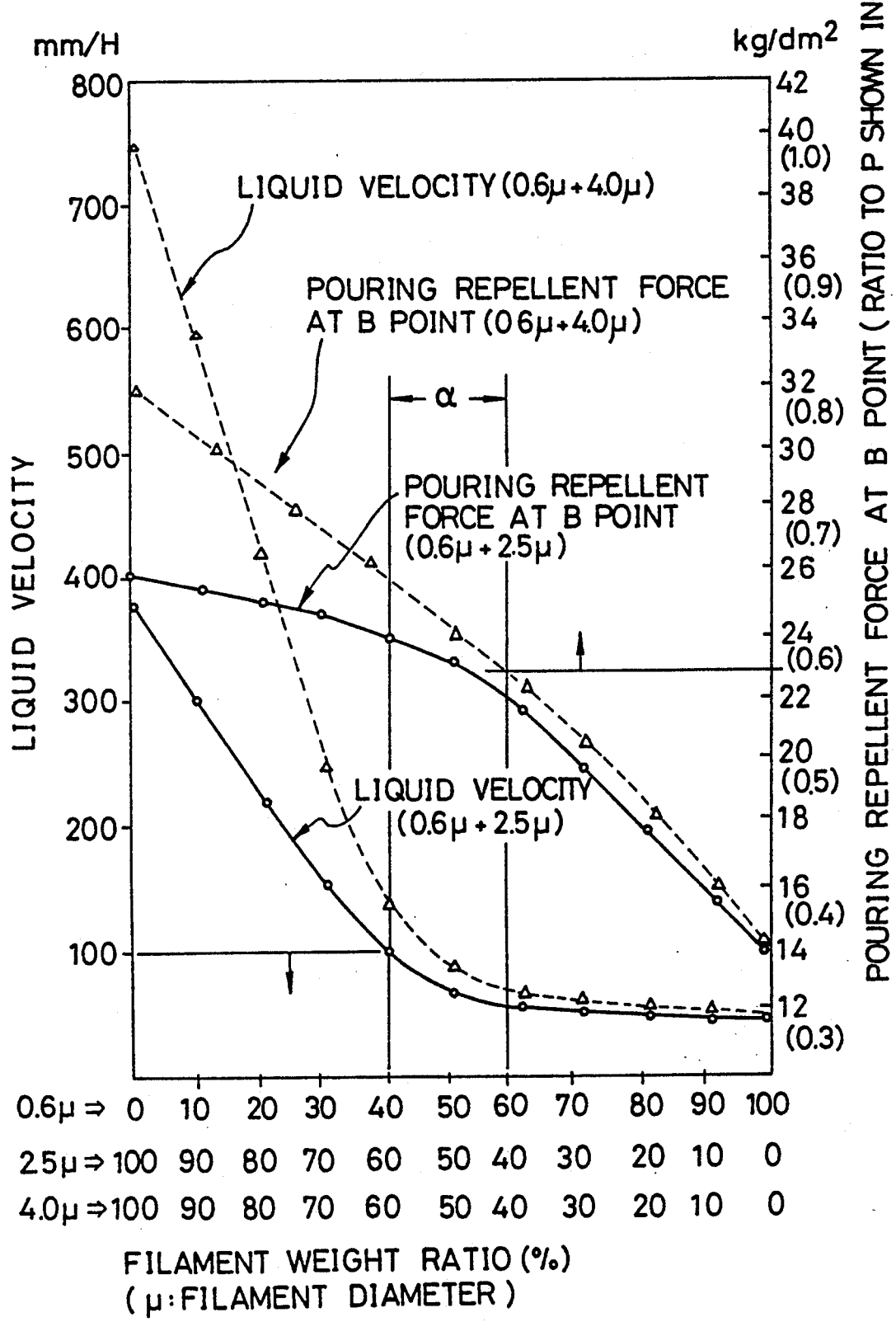

SHEET-LIKE SEPARATOR AND VALVE REGULATED LEAD ACID BATTERY

FIELD OF THE INVENTION AND RELATED ART STATEMENT

The present invention relates to a sheet-like separator and a valve regulated lead acid battery, and particularly to an inexpensive sheet-like separator and a valve regulated lead acid battery which causes less stratification of an electrolyte and which has a long life.

A valve regulated lead acid battery comprises separators and plates stacked within a sealed container, in which an electrolyte in a cell is retained in the pores of the separators and both of positive and negative electrode plates so as not to flow. The valve regulated lead acid battery has an advantageous feature of excellent liquid leakage proofness, requiring no water supplement and causing less self-discharge.

As described in Japanese Patent Publication No. Sho 63-27826, in a large capacity valve regulated lead acid battery with a great plate height, the electrolyte retained in the pores of the separators and the plates results in difference of the concentration in view of the vertical direction when charge and discharge are repeated although the concentration is uniform at the time of injection. That is, stratification is caused in which the concentration of the electrolyte is higher in the lower portion than in the upper portion of the separator. Since the stratification tends to be caused mainly in the separator, it is required to increase the electrolyte retention of the separator, eliminate the difference in the electrolyte retention between the upper and lower portions of the separator or increase the viscosity of the electrolyte by adding a fine silica powder.

Separators mainly composed of glass fibers have been predominantly used so far. For preventing the occurrence of stratification, various improvements have been attempted for enhancing the electrolyte retention of the separators used.

For instance, Japanese Patent Laid-Open Sho 62-133669 and 62-136751 disclose separators coated or mixed with a powder, for example, of $SiO_2$, $TiO_2$ or an oxide of rare earth element. Japanese Patent Laid-Open Sho 63-152853 and 61-269852 disclose the use of silica or foamed pearlite as a powder. Further, Japanese Patent Laid-Open Sho 63-143742 and 63-146348 disclose a separator comprising fine hollow glass fibers.

The techniques disclosed in the above publications which are representatives of improvements at prior art are roughly classified into the following three groups:

(1) Decreasing the average fiber diameter of glass fibers.
(2) Using organic fibers in combination with glass fibers.
(3) Using a silica powder in combination with glass fibers.

However, a decrease in the average fiber diameter of glass fibers brings about an increase in the cost. Although a glass fiber separator has good electrolyte absorption based on capillary phenomenon, it still has the problem of causing a decrease in repellent force during liquid injection.

The use of organic fibers has the possibility that impurities are eluted in an electrolyte.

The use of a silica powder together with glass fibers increases the density of the separator, decreases the porosity and decreases the amount of electrolyte retention, thereby decreasing the battery capacity. When a silica powder is used, although the silica powder can be easily added to an electrolyte, the process is complicated, resulting in an increase in the cost of the battery obtained. On the other hand, in the present situation, mixing of silica in a separator is not put into practice for the following reasons. Namely, since paper serving as a separator cannot be formed by using a silica powder only, a silica powder is mixed with glass fibers used as a main component. However, if the ratio of silica powder is low, the effect of preventing the stratification deteriorates, while if the ratio of silica powder is high, it is difficult to make paper.

As described above, a separator for a valve regulated lead acid battery which has an excellent effect of preventing stratification and which can be easily produced has not been provided so far. A conventional valve regulated lead acid battery thus produces stratification and has a short life.

The applicants previously made an application for patent which provides a valve regulated lead acid battery using a separator having an electrolyte dripping speed of 100 mm/hour or less as an inexpensive valve regulated lead acid battery having none of the above problems of conventional separators and a long life and causing less stratification. The applicants of this invention found a valve regulated lead acid battery using a separator having an electrolyte dripping speed of 100 mm/hour or less as an inexpensive valve regulated lead acid battery causing less stratification and having a long life and made an application for patent (Japanese Patent Laid-Open Hei 2-226654, referred to as "prior application" hereinafter). The separator of the prior application practically substantially comprises glass fibers only having an average fiber diameter of 0.65 µm or less or comprises 95 to 30% by weight of alkali-containing glass fibers having an average fiber diameter of 2 µm or less and 5 to 70% by weight of silica powder provided by a wet method and having a specific surface area of at least 100 $m^2/g$.

Although the inexpensive valve regulated lead acid battery disclosed in Japanese Patent Laid-Open No. Hei 2-226654 causes less stratification and has a long lift, it has the following problems:

When an electrolyte is slowly poured into a battery case after a plate group is set therein, the stacking pressure in the case is lower than the set pressure in a dry state. In this case, the following problems occurs:

(1) Since the softening speed of an anode active substance is increased, the active substance easily falls off.

(2) Since the separators cannot be easily placed in close contact with plates, a gap is formed therebetween to decrease the capacity of the battery obtained. As a result, the battery has a low electrolyte dripping speed, but the performance thereof is not sufficiently improved because of its small pouring repellent force.

The separator related to the prior application and substantially comprising glass fibers only having an average fiber diameter of 0.65 µm or less costs much. On the other hand, a separator containing a silica powder must be excessively increased in hardness for preventing stratification, as described above, and the separator is thus unsuitable.

In addition, a separator which can maintain constant stacking pressure by absorbing a deviation in thickness of the plates has not yet been proposed. In the present situation, the discharge properties (particularly, highefficiency discharge) deteriorate under excessively low stacking pressure, and the plates cannot be easily inserted into a battery case under excessively high stacking pressure, sometime resulting in the breakage of the battery case or the impossibility to insert.

As described above, a separator for a valve regulated lead acid battery which has an excellent effect of preventing stratification and which can be easily produced and ensure constant stacking pressure and a valve regulated lead acid battery in which the use of such a separator improves the battery performance, increased the life and decrease the cost have not been provided by prior art including the prior application.

OBJECT AND SUMMARY OF THE INVENTION

It is an object of the present invention to provide a sheet-like separator and valve regulated lead acid battery using the separator which can provide an inexpensive valve regulated lead acid battery having none of the above problems of prior art, an excellent effect of preventing softening of an active substance and a long life.

It is another object of the present invention to provide a sheet-like separator and a valve regulated lead acid battery using the separator which causes less stratification of electrolyte and which can secure constant stacking pressure.

A sheet-like separator of the invention having an electrolyte dripping speed of 100 mm/hr or less is characterized in that the values of repellent force on the pouring repellent force curve of pouring of dilute sulfuric acid shown in FIG. 1 are as follows:

---
if S point = P kg/dm$^2$,
B point ≧ 0.55 P kg/dm$^2$
C point ≧ 0.40 P kg/dm$^2$.
---

A valve regulated lead acid battery of the present invention comprises the above sheet-like separator.

The sheet-like separator of the invention has significantly high electrolyte retention, uniform electrolyte retention in the vertical direction thereof, prevents stratification and softening of an active substance and thus has a very long life.

A small-capacity valve regulated lead acid battery and large-capacity valve regulated lead acid battery having high plates, which use the sheet-like separator of the invention, have stable and excellent battery performance and a long life. It is obvious that the increase in the battery life causes the exhibition of long cycle life performance, which is examined here, and long life performance of floating discharge.

The sheet-like separator of the present invention has excellent elasticity and can thus be incorporated into a battery case under constant stacking pressure. The separator can mainly be composed of relatively thick glass fibers (glass fibers having a relatively large diameter) and enables a decrease in the cost and the provision of an inexpensive valve regulated lead acid battery having excellent production workability.

The valve regulated lead acid battery of the present invention is inexpensive and has a long life and excellent battery performance.

BRIEF DESCRIPTION OF THE DRAWINGS

FIG. 3 is a graph showing the results of Example 5.

DESCRIPTION OF THE PREFERRED EMBODIMENTS

The present invention is described in detail below.

Figure 1:
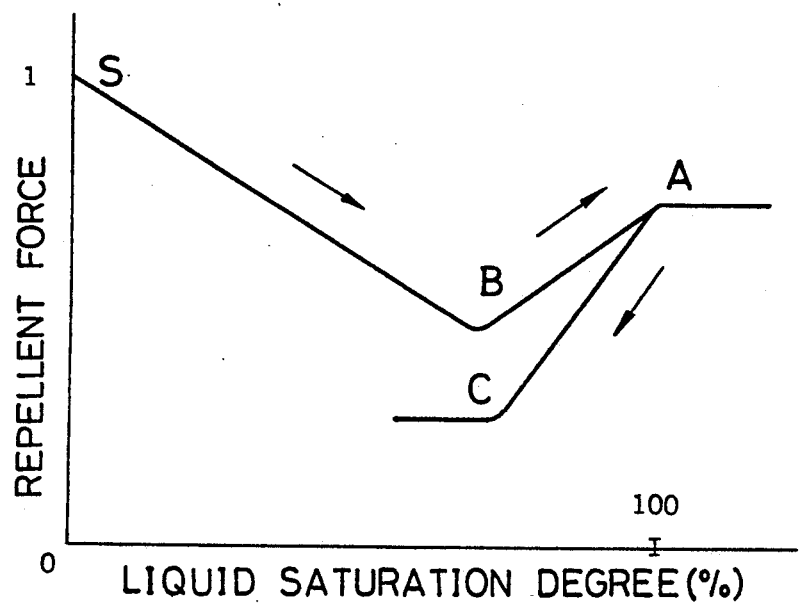
FIG. 1 is a graph showing a pouring repellent force curve.

The principle of the pouring repellent force curve shown in FIG. 1 is described below. In FIG. 1, the abscissa shows liquid saturation degree, and the ordinate shows repellent force.

When an electrolyte is gradually (at interval of 2 minutes) poured under constant load on a fine glass fiber mat, the curve shown in FIG. 1 is obtained. The position of each of points A, B, C of the curve is changed with a change in the diameter of the glass fibers which form the glass fiber mat.

(1) Point S—Point B

The repellent force is decreased due to concentraction of the separator.

(2) Point B—Point A

The liquid saturation degree becomes substantially 100% at point A due to expansion of the fine glass fiber mat.

(3) Point A—Point C

The repellent force is decreased due to recontraction of the separator on the basis of the same principle as that of the locus point S—point B (the positions of points B and C always have the relation, point B>point C).

(4) Positional deviation of point B from point C

Since the repellent force is measured for a short time (at intervals of 2 minutes), the repellent force is measured before the electrolyte is uniformly dispersed in the fine glass fiber mat after pouring, thereby producing the relation, point B>point C.

The sheet-like separator of the present invention has an electrolyte dripping speed of 100 mm/hr or less. A separator having an electrolyte dripping speed of above 100 mm/hr has low electrolyte retention and thus remarkably produces the stratification in which the electrolyte concentration is changed in the vertical direction of the separator by repeating charge and discharge. Although the electrolyte dripping speed is preferably as low as possible from the viewpoint of prevention of stratification, if the dripping speed is excessively low, much time is required for pouring the electrolyte. It is thus preferable that separator used in the valve regulated lead acid battery of the present invention has an electrolyte dripping speed of 80 mm/hr or less, preferably 5 to 80 mm/hr, and more preferably 20 to 70 mm/hr.

In the present invention, the pouring repellent force and the electrolyte dripping speed of the sheet-like separator can be determined by the method described in the examples below.

Preferred forms which can be employed for sheet-like separator of the present invention are the following:

(1) Comprising glass fibers only (2) Comprising glass fibers only, and partially subjected to water repellent treatment.

(3) Comprising organic fibers and glass fibers.

(4) Comprising glass fibers and a polyethylene powder.

In the case of form (1), the use of thin or fine glass fibers (glass fibers having a relatively small diameter) decreases the electrolyte dripping speed but decreases the pouring repellent force, and the use of thick glass fibers increases the pouring repellent force but increases the electrolyte dripping speed. In order to satisfy the electrolyte dripping speed and pouring repellent force which are specified in the invention, it is necessary to combine glass fibers with different diameters. The separator of the invention preferably has the fiber composition I below, and more preferably the fiber composition II below.

| Fiber composition I | |
|---|---|
| Fine glass fiber with an average fiber diameter of 0.4 to 0.7 μm: | 40 to 60% by weight |
| Medium-fine glass fiber with an average fiber diameter above 0.7 μm and less than 1.1 μm: | 20% by weight or less |
| Medium-thick glass fiber with an average fiber diameter of 1.1 to 5.0 μm: | 60 to 40% by weight |
| Thick glass fiber with an average fiber diameter above 5.0 μm and 30 μm or less: | 15% by weight or less |
| Fiber composition II | |
| Fine glass fiber with an average fiber diameter of 0.50 to 0.65 μm: | 44 to 56% by weight |
| Medium-fine glass fiber with an average fiber diameter above 0.65 μm and less than 2.0 μm: | 10% by weight or less |
| Medium-thick glass fiber with an average fiber diameter of 2.0 to 4.5 μm: | 44 to 56% by weight |
| Thick glass fiber with an average fiber diameter above 4.5 μm and 30 μm or less: | 10% by weight or less |

In the case of form (2), the water repellent treatment is preferably performed by a silane coupling agent. The average ratio of the silane coupling agent adhering to the glass fibers is preferably 0.01 to 4.0% by weight, and particularly 0.05 to 2.0% by weight, relative to the glass fibers subjected to water repellent treatment. The ratio of the glass fibers subjected to water repellent treatment is preferably 5 to 100% by weight relative to the glass fibers which form the separator. Since the silane coupling agent strongly adheres to the surfaces of the glass fibers and provides the surfaces with water repellency, the water repellent treatment can increase the pouring repellent force and decrease the electrolyte dripping speed. If the degree of water repellent treatment is beyond the above range, the above effects cannot be sufficiently attained in some cases. Silane has extremely high adhesion to the surfaces of glass fibers and is thus hardly eluted in the electrolyte used and is significantly useful.

Preferred glass fibers which can be used in the form (2) are the following:

(A) Glass fibers having an average fiber diameter of 2 μm or less.

(B) Glass fibers comprising glass fibers having an average fiber diameter of 2 μm or less and thick glass fibers having an average fiber diameter above 2 μm.

(C) Glass fibers having the fiber composition I or II.

In the cases (B) and (C), the fiber diameter of the glass fibers to be subjected to water repellent treatment is not limited, and at least one type of fine and thick glass fibers or at least one type of fine, medium-fine, medium-thick and thick glass fibers may be subjected to water repellent treatment.

In this case, small amounts of other substances which are harmless to a battery may be mixed (refer to Japanese Patent Laid-Open Sho 64-52375).

In the form (3), preferable organic fibers are polypropylene fibers having an average fiber diameter of 2 to 20 μm and an average fiber length of 2 to 25 mm, and the separator preferably substantially comprises 7 to 35% by weight organic fibers and 93 to 65% by weight glass fibers.

Namely, polypropylene fibers have high water repellency and are thus effective for the present invention. Polypropylene fibers having an average fiber diameter of less than 2 μm are expensive, and polypropylene having an average fiber diameter above 20 μm have a low effect. In addition, with an average fiber length of less than 2 mm, the cutting cost is high, and with an average fiber length above 25 mm, dispersibility properties deteriorate. Further, if the ratio of the organic fibers mixed is less than 7% by weight, the effect is low, while if the ratio exceeds 35% by weight, electrolyte retention deteriorates.

In the form (3), the above glass fibers (A) to (C) can be used.

In the form (4), a polyethylene powder preferably has an average particle size of 2 to 10 μm. If the polyethylene powder has an average particle size of less than 2 μm, the cost is increased, while if the powder has an average particle size above 10 μm, the effect of decreasing the electrolyte dripping speed deteriorates. Both cases are unsuitable.

If the ratio of the polyethylene powder is less than 0.5% by weight, mixing of the polyethylene powder does not sufficiently produce effects, while if the ratio exceeds 5.0% by weight, the polyethylene powder excessively mixed makes the electrolyte difficult to permeate the separator. The ratio of the polyethylene powder in the separator is thus within the range of 0.5 to 5.0% by weight.

Since the polyethylene powder is hydrophobic, the mixing of the polyethylene powder permits an effective decrease in the electrolyte dripping speed of the separator. It is thus possible to prevent the stratification of the separator.

Since the polyethylene powder also has the effect of weakening the adhesion between glass fibers, the separator formed has good flexibility and becomes soft. The separator thus can secure constant stacking pressure.

In addition, the use of the polyethylene powder enables necessary characteristics to be secured without using fine glass fibers. This enables the separator to be provided by using relatively thick glass fibers at low cost.

The mixing ratio of relatively thick glass fibers can thus be increased to a value higher than those in the above fiber compositions I and II. For example, the ratio of medium-thick glass fibers with an average fiber diameter of 1.1 to 5.0 μm can be increased, as shown in the fiber compositions III, preferably fiber composition IV, below.

| Fiber composition III | |
|---|---|
| Fine glass fiber with an average fiber diameter of 0.4 to 0.7 μm: | 25 to 60% by weight |
| Medium-fine glass fiber with an average fiber diameter above 0.7 μm and less than 1.1 μm: | 0 to 20% by weight |
| Medium-thick glass fiber with an average fiber diameter of 1.1 to 5.0 μm: | 75 to 40% by weight |
| Thick glass fiber with an average fiber diameter above 5.0 μm and 30 μm or less: | 0 to 15% by weight |
| Fiber composition IV | |
| Fine glass fiber with an average fiber diameter of 0.50 to 0.65 μm: | 24 to 56% by weight |
| Medium-fine glass fiber with an average fiber diameter above 0.65 μm and less than 2.0 μm: | 0 to 10% by weight |

-continued

| | |
|---|---|
| Medium-thick glass fiber with an average fiber diameter of 2.0 to 4.5 μm: | 71 to 36% by weight |
| Thick glass fiber with an average fiber diameter above 4.5 μm and 30 μm or less: | 0 to 10% by weight |

The separator in the form (4), the following characteristics which are measured by the measurement methods used in the examples below can be secured.

| | |
|---|---|
| Electrolyte dripping speed: | 100 mm/hr or less |
| Apparent density/stacking pressure: | $1.3 \times 10^{-4}$ or more |
| Density under pressure of 20 kg/dm2: | $0.165 \text{ g/cm}^3$ or less |
| Tensile strength: | 200 g/15 mm width or more |
| Electrolyte retention: | 0.6 g/cc or more |
| Liquid absorption: | 50 mm/5 minutes or more |

Alkali-containing silicate glass fibers, particularly glass fibers having good acid resistance, are preferably used as glass fibers in the invention because they are used in a battery. The extent of acid resistance is preferable such that the loss of weight is 2% or less when measured using glass fibers having an average fiber diameter of 1 μm or less in accordance with JIS C-2202. Examples of such glass fibers include glass fibers mainly containing 60 to 75% by weight $SiO_2$ and 8 to 20% by weight $R_2O$ (alkali metal oxides such as $Na_2O$, $K_2O$ and the like) in which the sum of $SiO_2$ and $R_2O$ is 75 to 90%, and further containing at least one of other components such as CaO, MgO, $B_2O_3$, $Al_2O_3$, ZnO, $Fe_2O_3$ and the like. Examples of preferred alkali-containing silicate glass are shown in Table 1 below.

TABLE 1

| Component (wt %) | Kind of glass | | |
|---|---|---|---|
| | A | B | C |
| $SiO_2$ | 68.5 | 66.5 | 72.6 |
| CaO | 6.7 | 6.5 | 7.3 |
| MgO | 2.5 | 2.6 | 3.9 |
| $B_2O_3$ | 4.0 | 4.7 | — |
| $Na_2O$ | 14.1 | 10.1 | 13.0 |
| $K_2O$ | 1.4 | 1.5 | 0.9 |
| $Al_2O_3$ | 2.5 | 4.1 | 1.7 |
| ZnO | — | 3.6 | — |
| $Fe_2O_3$ | — | — | 0.1 |

It is advantageous to produce the separator of the present invention, for example, by the method below.

Relatively short glass fibers are prepared by a FA method (Flame Attenuation Method), centrifugal method or the like, which are disintegrated, cut and dispersed by a pulper.

Alternately, glass fibers may be cut short by an appropriate cutting means in the midway of supplying them to a paper making machine net.

The cut glass fibers and polyethylene powder (in the form (4)) are formed into a sheet on the net. The glass fiber sheet formed by the wet method is generally dried along a drum or a dryer to form a product.

During paper making, a dispersant may be used when fibers are dispersed in water. In addition, dialkyl sulfosuccinate is caused to adhere to the glass fibers, for example, by spraying on the fiber paper on the paper making net in an amount of 0.005 to 10% by weight relative to the amount of the glass fibers so that the electrolyte retention can be improved by the hydrophobic property possessed by dialkyl sulfosuccinate. Dialkyl sulfosuccinate may be mixed in the water dispersion contained in a paper making bath in place of the spraying.

Although the thickness of the separator of the present invention is not limited, the thickness is preferably larger than the average fiber length of the glass fibers used.

The valve regulated lead acid battery of the present invention can easily be produced by a usual method using the above separator of the present invention.

Examples and comparative examples are described below.

In the examples and comparative examples, each of the electrolyte dripping speed, pouring repellent force, battery life cycle, tensile strength, liquid absorption, electrolyte retention, thickness and METSUKE is measured by the following method:

Electrolyte Dripping Speed (1) A specimen is cut into a size of 50 mm × 250 mm.

(2) The specimen is set between two acryl resin plates (70–80 mm width × 500 mm length) opposed through spacers at both ends such that the weight of the specimen is about 6.75 g (charging density: 0.16 to 0.21 $g/cm^3$).

(3) The specimen is dipped into water.

(4) The specimen in a water saturated state is set to a measuring jig.

(5) A sulfuric acid solution with a specific gravity of 1.3 is poured by a pipette from above the acryl resin plate.

The poured sulfuric acid solution is to 100 mm height from above the specimen and this height is kept constant by occasionally supplementing the sulfuric acid solution.

The sulfuric acid solution is previously tinted by red ink or methyl orange.

(6) After completing the pouring of the electrolyte, each falling distance after 5 min, 10 min, 30 min and 60 min is measured by a steel measuring tape. The time is correctly measured by a stop watch.

(7) Measurement is conducted three times for each sample.

Pouring Repellent Force

Figure 2:
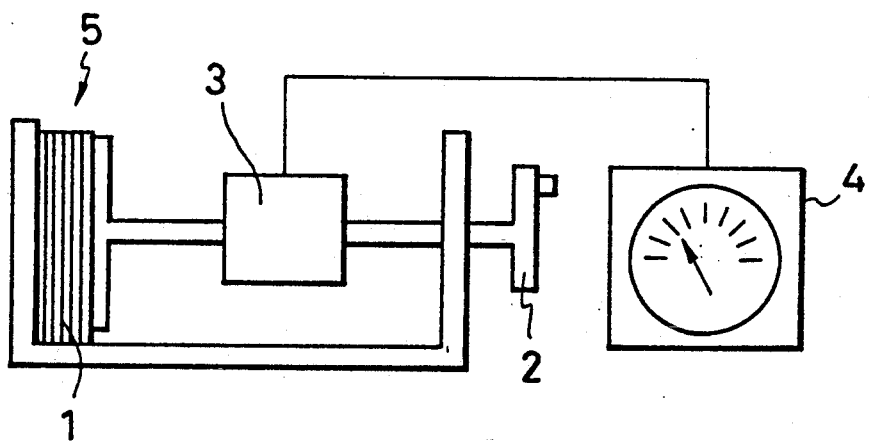
FIG. 2 is a drawing explaining an apparatus for measuring pouring repellent force.

Measurement is made by the following method using the repellent force testing machine shown in FIG. 2:

(1) A specimen of a separator is cut into 30 sheets where each of the sheets is of 100 mm × 100 mm. The 30 sheets are divided into three sets. Each set is composed of ten sheets.

(2) The weight of each set of ten sheets thus prepared is measured.

(3) Preliminary experiment is first performed.

Procedure of preliminary experiment:

1. One set of the specimen of ten sheets 1 is placed in the repellent force testing machine and then compressed by turning a handle 2. The compressive force is detected by a load cell 3 and read by a pressure gauge 4 so as to be set to 40 $kg/m^2$.

2. After setting, a dilute sulfuric acid solution 5 which has a specific gravity of 1.30 is gradually added from the upper side thereof, and the total amount of the dilute sulfuric acid solution added until the solution flows out of the sides of the specimen 1.

3. It is assumed that the amount of the sulfuric acid solution added until the solution flows out of the specimen is W.

(4) After the preliminary experiment is completed, another specimen (another set of the ten sheets prepared in the above (1)) is placed in the repellent force testing machine, and the pressure is set to 40 kg/m². After setting, the pressure is set to 40 kg/m² at intervals of 1 minute so that the pressure is 40 kg/m² after 5 minutes have passed.

(5) After setting, the thickness of the specimen is measured at four points thereof by a calipers.

(6) The dilute sulfuric acid solution is added 10 g at a time to the specimen, and the change in pressure after 2 minutes have passed is measured.

(7) When the amount of the dilute sulfuric acid solution added to the specimen becomes (W-20) grams, the sulfuric acid solution is added 5 g at a time. The change in pressure after 2 minutes have passed is measured. The above "W" is that of assumed in the preliminary experiment (3).3.

(8) An excessive dilute sulfuric acid solution (which is not absorbed by the specimen because of saturation) is sucked by a syringe or injector, and the amount of the solution sucked is measured and recorded.

(9) The sulfuric acid solution absorbed by the specimen is finally sucked by an injector.

(10) The operation (9) is precisely performed until the pressure does not change.

(11) Measurement is preformed at least two times.

(12) The results in terms of ratio of change on the assumption that the stacking pressure at the start is 1 are shown at points S, B and C in the graph shown in FIG. 1.

Battery Life Cycle

Valve regulated lead acid batteries were assembled using various separators. Each of the valve regulated lead acid batteries comprised two positive plates of 40 mm width×70 mm length×3.3 mm thickness and a negative plate of the same size and 2.0 mm thickness, which were stacked through a predetermined separator under a pressure of 20 kg/dm². A $H_2SO_4$ solution with a specific gravity of 1.30 was poured in an amount of 43 cc per cell, and the capacity per cell is 5 Ah/20HR.

Each of the batteries assembled was subjected to a cycle life test in a cycle comprising discharge at 1.4A for 3 hours and charge at 1.02A for 5 hours. The life was defined as a point of time at which the capacity of the cell was reduced to 4.2 Ah (=1.4A×3 h) or less.

Tensile Strength

The tensile strength is shown in terms of the value (g) of the external force at the time a specimen of 15 mm width is cut by pulling at both ends thereof,

Liquid Absorption

A specimen is vertically placed, and the lower portion thereof is dipped in a dilute sulfuric acid solution with a specific gravity of 1.03. The height of the solution increased for 5 minutes is measured.

Electrolyte Retention

The weight and thickness of a specimen are previously measured. After dipping the specimen in a band filled with water for 30 seconds, the specimen is pulled up on an inclined bench and maintained at 45° for 5 minutes, and then the weight of the specimen is $$\text{Electrolyte retention (g/cc)} = \frac{(W_2 - W_1)}{1 \times W \times t}$$

where
$W_1$: weight of specimen before dipping (g)
$W_2$: weight of specimen after dipping (g)

| | |
|---|---|
| $W_1$: weight of specimen before dipping (g) | |
| $W_2$: weight of specimen after dipping (g) | |
| l: length | 25 cm |
| W: width (cm) | |
| t: actual thickness of specimen (cm) | 5 cm |

Apparent Density/Stacking Pressure

A difference between the apparent density $D_{60}$ at pressure of 60 kg/dm² and the apparent density $D_{10}$ at a pressure of 10 kg/dm² is divided by 50 kg/dm² to obtain a value $(D_{60}-D_{10})/50$, i.e., (apparent density/stacking pressure).

Basic Weight

Basic weight is a value obtained by dividing the weight of a specimen by the area thereof.

Thickness

The thickness of a specimen is measured in a state pressed by a load of 20 kg/dm² in the direction of the thickness thereof (JISC-2202).

EXAMPLES 1 AND 2 AND COMPARATIVE EXAMPLES 1 to 5

Sheet-like separators each having the values of electrolyte dripping speed and pouring repellent force shown in Table 2 were produced and examined with respect to their battery life cycle. The results obtained are shown in Table 2.

TABLE 2

| Example No. | | Example | | Comparative Example | | | | |
|---|---|---|---|---|---|---|---|---|
| | | 1 | 2 | 1 | 2 | 3 | 4 | 5 |
| Basic weight (g/m²) | | 156 | 154 | 158 | 155 | 156 | 153 | 155 |
| Thickness (mm) | | 1.11 | 1.10 | 1.09 | 1.12 | 1.10 | 1.10 | 1.12 |
| Electrolyte dripping speed (mm/hr) | | 68 | 80 | 75 | 60 | 110 | 1.50 | 250 |
| Pouring repellent force (kg/dm²)* | B | 23.5 | 24 | 20.5 | 19.5 | 25.0 | 25.0 | 27 |
| | | (0.59) | (0.60) | (0.51) | (0.49) | (0.63) | (0.63) | (0.68) |
| | C | 18.5 | 20 | 13.9 | 13.2 | 16.5 | 20.4 | 22.5 |
| | | (0.46) | (0.50) | (0.35) | (0.33) | (0.41) | (0.51) | (0.56) |
| | S | 40 | 40 | 40 | 40 | 40 | 40 | 40 |
| | | (1.00) | (1.00) | (1.00) | (1.00) | (1.00) | (1.00) | (1.00) |
| Life cycle (number of cycles) | | 595 | 560 | 495 | 490 | 320 | 305 | 285 |

*: The value in parentheses shows a ratio on the assumption that S is 1.

EXAMPLES 3 TO 5 AND COMPARATIVE EXAMPLES 6 TO 11

The various physical properties and characteristics of each of separators having the glass fiber compositions shown in Table 3 were examined. The results obtained are shown in Table 3.

TABLE 3

| Example | C6 | 3 | C7 | C8 | 4 | C9 | C10 | 5 | C11 |
|---|---|---|---|---|---|---|---|---|---|
| Composition (wt %) | | | | | | | | | |
| Glass fiber (0.6 μm) | 30 | 50 | 70 | 30 | 50 | 70 | | 45 | 40 |
| Glass fiber (2.5 μm) | 70 | 50 | 30 | | | | | | |
| Glass fiber (4.0 μm) | | | | 70 | 50 | 30 | | 45 | 40 |
| Glass fiber (0.8 μm) | | | | | | | 100 | | |
| Glass fiber (19 μm) | | | | | | | | 10 | 20 |
| Basic weight (g/m$^2$) | 159 | 153 | 147 | 162 | 157 | 152 | 157 | 163 | 169 |
| Thickness (mm) | 1.184 | 1.192 | 1.186 | 1.201 | 1.204 | 1.198 | 1.177 | 1.200 | 1.196 |
| Tensile strength (g/15 mm width) | 420 | 590 | 630 | 400 | 550 | 610 | 587 | 530 | 490 |
| Electrolyte retention (g/cc) | 1.75 | 1.62 | 1.34 | 1.90 | 1.72 | 1.56 | 1.61 | 1.60 | 1.38 |
| Electrolyte dripping speed (mm/hr) | 150 | 68 | 60 | 250 | 80 | 75 | 110 | 80 | 105 |
| Pouring repellent force (kg/dm$^2$)*2  S | 40 (1.00) | 40 (1.00) | 40 (1.00) | 40 (1.00) | 40 (1.00) | 40 (1.00) | 40 (1.00) | 40 (1.00) | 40 (1.00) |
|   B | 25.0 (0.63) | 23.5 (0.58) | 19.5 (0.49) | 27.0 (0.68) | 24.0 (0.60) | 20.5 (0.51) | 22.0 (0.55) | 23.0 (0.58) | 21.5 (0.54) |
|   C | 20.4 (0.50) | 18.5 (0.46) | 13.2 (0.33) | 22.5 (0.56) | 20.0 (0.50) | 13.9 (0.35) | 12.5 (0.31) | 17.0 (0.43) | 13.8 (0.35) |
| Life cycle (cycles) | 305 | 595 | 490 | 285 | 560 | 495 | 320 | 555 | 480 |

*1: C6, C7, C8, C9, C10 and C11 are Comparative Examples.
*2: The value in parentheses shows a ratio on the assumption that S is 1.

EXAMPLE 6

The electrolyte dripping speed and pouring repellent force (point B) of each of the glass fiber composition systems having the average fiber diameters shown in FIG. 3 were examined. The results are shown in FIG. 3. In FIG. 3, a solid line shows the results of a glass fiber composition system comprising glass fibers with an average fiber diameter of 0.6 μm and glass fibers with an average fiber diameter of 2.0 μm, and a broken line shows the results of a glass fiber composition system comprising glass fibers with an average fiber diameter of 0.6 μm and glass fibers with an average fiber diameter of 4.0 μm. As seen from FIG. 3, a glass fiber composition within the range α is preferable.

When small amounts of thick glass fibers having an average fiber diameter above 5 μm and less than 30 μm are mixed, as in Example 5 shown in Table 3, although an attempt can be made to decrease the cost, mixing of large amounts of thick fibers causes deterioration in the electrolyte dripping speed and the pouring repellent force due to the low flexibility of the fibers, as Comparative Example 11. It is thus necessary to limit the amount of thick fibers mixed to 15% by weight or less, preferably 10% by weight or less.

EXAMPLES 7 TO 23 AND COMPARATIVE EXAMPLES 12 TO 14

The various characteristics of each of the separators respectively having the glass fiber compositions shown in Tables 4 to 6 were examined. The results obtained are shown in Tables 4 to 6.

TABLE 4

| | | Comparative Example | | Example | | | | Comparative Example |
|---|---|---|---|---|---|---|---|---|
| Example | | 12 wt % | 13 wt % | 7 wt % | 8 wt % | 9 wt % | 10 wt % | 14 wt % |
| Glass fiber | | | | | | | | |
| Average diameter | Silane treatment | | | | | | | |
| 0.8 (μ) | 0 (%) | 100 | | | | | | 90 |
| 0.8 | 0.005 | | 100 | | | | | |
| 0.8 | 0.02 | | | 100 | | | | |
| 0.8 | 0.05 | | | | 100 | | | 10 |
| 0.8 | 0.60 | | | | | 100 | | |
| 0.8 | 4.0 | | | | | | 100 | |
| 0.8 | 7.0 | | | | | | | |
| Average silane treatment (%) | | 0 | 0.005 | 0.02 | 0.05 | 0.60 | 4.0 | 0.005 |
| Basic weight (g/m$^2$) | | 157 | 152 | 149 | 154 | 154 | 155 | 155 |
| Thickness (mm) | | 1.18 | 1.17 | 1.17 | 1.15 | 1.13 | 1.13 | 1.12 |
| Tensile strength (g/15 mm width) | | 587 | 580 | 570 | 575 | 560 | 550 | 542 |
| Liquid absorption (mm/5 min) | | 106 | 100 | 80 | 64 | 56 | 52 | 99 |
| Electrolyte dripping speed (mm/hr) | | 110 | 104 | 81 | 82 | 72 | 55 | 98 |
| Pouring repellent  B | | 22.0 (0.55) | 22.5 (0.56) | 23.0 (0.58) | 23.2 (0.58) | 23.7 (0.59) | 23.9 (0.60) | 22.1 (0.55) |

TABLE 4-continued

|  |  | Comparative Example | | Example | | | | Comparative Example |
|---|---|---|---|---|---|---|---|---|
| Example |  | 12 wt % | 13 wt % | 7 wt % | 8 wt % | 9 wt % | 10 wt % | 14 wt % |
| force | C | 12.5 | 12.6 | 16.0 | 16.4 | 16.5 | 16.8 | 13.5 |
| (kg/dm$^2$)* |  | (0.31) | (0.32) | (0.40) | (0.40) | (0.41) | (0.42) | (0.34) |
|  | S | 40 | 40 | 40 | 40 | 40 | 40 | 40 |
|  |  | (1.00) | (1.00) | (1.00) | (1.00) | (1.00) | (1.00) | (1.00) |
| Life cycle (cycles) |  | 320 | 480 | 500 | 540 | 535 | 501 | 330 |
| Evaluation** |  | x | x | Δ | o | o | Δ | x |

*) The value in parentheses shows a ratio on the assumption that S is 1.
**) Evaluation
o: excellent
Δ: good
x: poor

TABLE 5

|  |  | Example | | | | | | |
|---|---|---|---|---|---|---|---|---|
| Example |  | 11 wt % | 12 wt % | 13 wt % | 14 wt % | 15 wt % | 16 wt % | 17 wt % |
| Glass fiber | | | | | | | | |
| Average diameter | Silane treatment | | | | | | | |
| 0.8 (μ) | 0 (%) | 70 | 50 | 30 | 10 | 90 | 70 | 10 |
| 0.8 | 0.005 | | | | | | | |
| 0.8 | 0.02 | | | | | | | |
| 0.8 | 0.05 | 30 | 50 | 70 | 90 | | | |
| 0.8 | 0.60 | | | | | 10 | 50 | 90 |
| 0.8 | 4.0 | | | | | | | |
| 0.8 | 7.0 | | | | | | | |
| Average silane treatment (%) | | 0.015 | 0.025 | 0.035 | 0.045 | 0.06 | 0.30 | 0.54 |
| Basic weight (g/m$^2$) | | 152 | 150 | 156 | 153 | 157 | 155 | 154 |
| Thickness (mm) | | 1.20 | 1.20 | 1.20 | 1.19 | 1.20 | 1.12 | 1.13 |
| Tensile strength (g/15 mm width) | | 550 | 540 | 540 | 550 | 560 | 550 | 546 |
| Liquid absorption (mm/5 min) | | 80 | 77 | 74 | 70 | 69 | 62 | 59 |
| Electrolyte dripping speed (mm/hr) | | 81 | 76 | 73 | 70 | 70 | 67 | 66 |
| Pouring repellent | B | 23.0 | 23.3 | 23.3 | 23.2 | 23.4 | 23.6 | 23.6 |
|  |  | (0.58) | (0.58) | (0.58) | (0.58) | (0.59) | (0.59) | (0.59) |
| force | C | 16.0 | 16.6 | 16.8 | 17.5 | 18.4 | 16.3 | 16.6 |
| (kg/dm$^2$)* |  | (0.40) | (0.42) | (0.42) | (0.44) | (0.46) | (0.41) | (0.42) |
|  | S | 40 | 40 | 40 | 40 | 40 | 40 | 40 |
|  |  | (1.00) | (1.00) | (1.00) | (1.00) | (1.00) | (1.00) | (1.00) |
| Life cycle (cycles) | | 510 | 508 | 510 | 515 | 520 | 535 | 530 |
| Evaluation** | | Δ | Δ | Δ | Δ | o | o | o |

*) The value in parentheses shows a ratio on the assumption that S is 1.
**) Evaluation
o: excellent
Δ: good

TABLE 6

|  |  | Example | | | | | |
|---|---|---|---|---|---|---|---|
| Example |  | 18 wt % | 19 wt % | 20 wt % | 21 wt % | 22 wt % | 23 wt % |
| Glass fiber | | | | | | | |
| Average diameter | Silane treatment | | | | | | |
| 0.8 (μ) | 0 (%) | 90 | 50 | 10 | 90 | 70 | 50 |
| 0.8 | 0.005 | | | | | | |
| 0.8 | 0.02 | | | | | | |
| 0.8 | 0.05 | | | | | | |
| 0.8 | 0.60 | | | | | | |
| 0.8 | 4.0 | 10 | 50 | 90 | | | |
| 0.8 | 7.0 | | | | 10 | 30 | 50 |
| Average silane treatment (%) | | 0.70 | 2.00 | 3.60 | 0.70 | 2.10 | 3.50 |
| Basic weight (g/m$^2$) | | 154 | 149 | 152 | 153 | 152 | 152 |
| Thickness (mm) | | 1.15 | 1.17 | 1.17 | 1.16 | 1.19 | 1.20 |
| Tensile strength (g/15 mm width) | | 541 | 530 | 528 | 540 | 519 | 518 |
| Liquid absorption (mm/5 min) | | 58 | 56 | 52 | 57 | 53 | 51 |

TABLE 6-continued

| | | Example | | | | | |
|---|---|---|---|---|---|---|---|
| Example | | 18 wt % | 19 wt % | 20 wt % | 21 wt % | 22 wt % | 23 wt % |
| Electrolyte dripping speed (mm/hr) | | 61 | 57 | 56 | 61 | 55 | 57 |
| Pouring repellent force (kg/dm²)* | B | 23.7 (0.59) | 23.8 (0.60) | 23.9 (0.60) | 23.7 (0.59) | 23.7 (0.59) | 23.9 (0.60) |
| | C | 16.7 (0.42) | 16.7 (0.42) | 16.8 (0.42) | 16.9 (0.42) | 17.4 (0.44) | 17.7 (0.44) |
| | S | 40 (1.00) | 40 (1.00) | 40 (1.00) | 40 (1.00) | 40 (1.00) | 40 (1.00) |
| Life cycle (cycles) | | 550 | 540 | 501 | 530 | 506 | 503 |
| Evaluation** | | ○ | ○ | Δ | ○ | Δ | Δ |

*) The value in parentheses shows a ratio on the assumption that S is 1.
**) Evaluation
○: excellent
Δ: good

EXAMPLES 24, 25 AND COMPARATIVE EXAMPLES 15 TO 20

The various characteristics of each of the separators having the fiber compositions shown in Table 7 were examined. The results obtained are shown in Table 7.

The organic fibers used are following:

| Polypropylene fiber = | average fiber diameter 8 μm average fiber length 5 mm |
|---|---|
| Polyethylene fiber = | average fiber diameter 8 μm |
| Polyester fiber = | average fiber length 2 mm average fiber diameter 7 μm average fiber length 5 mm |

TABLE 7

| | Example*¹ | | | | | | | |
|---|---|---|---|---|---|---|---|---|
| Example | C15 | C16 | 24 | 25 | C17 | C18 | C19 | C20 |
| Composition (wt %) | | | | | | | | |
| Glass fiber (0.6 μm) | | | | | | | | |
| Glass fiber (0.7 μm) | 100 | 95 | 90 | 70 | 90 | 70 | 90 | 70 |
| Glass fiber (0.8 μm) | | | | | | | | |
| Polypropylene fiber | | 5 | 10 | 30 | | | | |
| Polyethylene fiber | | | | | 10 | 30 | | |
| Polyester fiber | | | | | | | 10 | 30 |
| Basic weight (g/m²) | 157 | 148 | 151 | 150 | 146 | 141 | 140 | 142 |
| Thickness (mm) | 1.177 | 1.182 | 1.170 | 0.116 | 1.193 | 1.143 | 1.201 | 1.185 |
| Density (g/cm³) | 0.133 | 0.125 | 0.129 | 0.129 | 0.122 | 0.123 | 0.117 | 0.120 |
| Tensile strength (g/15 mm width) | 587 | 592 | 603 | 624 | 524 | 535 | 468 | 477 |
| Electrolyte retention (g/cc) | 1.61 | 1.70 | 1.48 | 1.38 | 1.23 | 1.19 | 1.65 | 1.42 |
| Electrolyte dripping speed (mm/hr) | 64 | 62 | 52 | 49 | 56 | 78 | 78 | 66 |
| Pouring repellent force (kg/dm²)*² A | 26.0 (0.65) | 27.0 (0.68) | 30.0 (0.75) | 32.0 (0.60) | 26.0 (0.65) | 27.0 (0.68) | 26.6 (0.67) | 29.5 (0.74) |
| B | 17.5 (0.44) | 27.5 (0.56) | 25.5 (0.64) | 26.5 (0.66) | 20.1 (0.50) | 23.5 (0.59) | 21.8 (0.55) | 23.3 (0.58) |
| C | 10.5 (0.26) | 15.6 (0.39) | 17.0 (0.43) | 18.4 (0.46) | 12.4 (0.31) | 14.5 (0.36) | 13.5 (0.34) | 14.7 (0.37) |
| S | 4.0 (1.00) | 4.0 (1.00) | 4.0 (1.00) | 4.0 (1.00) | 4.0 (1.00) | 4.0 (1.00) | 4.0 (1.00) | 4.0 (1.00) |
| Life cycle (cycles) | 320 | 460 | 530 | 540 | 380 | 420 | 400 | 440 |

*¹: C15, C16, C17, C18, C19 and C20 are Comparative Examples.
*²: The value in parentheses shows a ratio on the assumption that S is 1.

EXAMPLES 26 TO 29 AND COMPARATIVE EXAMPLES 21 TO 26

The various characteristics of the separator having the fiber compositions shown in Table 8 were examined. The results obtained are shown in Table 8.

TABLE 8

| | | Example | | | | Comparative Examples | | | | | |
|---|---|---|---|---|---|---|---|---|---|---|---|
| Example | | 26 | 27 | 28 | 29 | 21 | 22 | 23 | 24 | 25 | 26 |
| Material (parts by weight) | | | | | | | | | | | |
| Glass fiber | (0.6 μm) | 40 | 40 | 30 | 30 | | | | 30 | 30 | 20 |
| | (0.8 μm) | | | | | 70 | 99.9 | 94.0 | | | |
| | (2.5 μm) | 58.5 | | | | | | | | | |
| | (4.0 μm) | | 56.0 | 68.5 | 58.5 | | | | 69.9 | 64.0 | 58.5 |
| | (19 μm) | | | | 10 | | | | | | 20 |
| Wet silica powder*¹ | | | | | | 30 | | | | | |
| Polyethylene | | 1.5 | 4.0 | 1.5 | 1.5 | | 0.1 | 6.0 | 0.1 | 6.0 | 1.5 |

TABLE 8-continued

| | | Example | | | | Comparative Examples | | | | | |
|---|---|---|---|---|---|---|---|---|---|---|---|
| Example | | 26 | 27 | 28 | 29 | 21 | 22 | 23 | 24 | 25 | 26 |
| powder*2 | | | | | | | | | | | |
| Basic weight (g/m²) | | 174 | 176 | 173 | 180 | 189 | 154 | 167 | 170 | 169 | 172 |
| Thickness (mm) | | 1.09 | 1.10 | 1.10 | 1.11 | 1.11 | 1.10 | 1.11 | 1.10 | 1.11 | 1.10 |
| Tensile strength (g/15 mm width) | | 390 | 230 | 255 | 230 | 830 | 540 | 190 | 480 | 191 | 210 |
| Electrolyte retention (g/cc) | | 1.2 | 1.2 | 1.3 | 1.2 | 1.1 | 1.4 | 0.5 | 1.5 | 0.6 | 1.2 |
| Electrolyte dripping speed (mm/hr) | | 98 | 97 | 80 | 88 | 68 | 108 | 105 | 121 | 103 | 120 |
| Pouring repellent force (kg/dm²)*3 | S | 40 (1.00) | 40 (1.00) | 40 (1.00) | 40 (1.00) | 40 (1.00) | 40 (1.00) | *4 40 (1.00) | 40 (1.00) | *4 40 (1.00) | 40 (1.00) |
| | B | 26.0 (0.65) | 26.5 (0.66) | 28.0 (0.70) | 26.6 (0.67) | 17.0 (0.43) | 19.4 (0.50) | 19.8 (0.50) | 28.6 (0.72) | 29.0 (0.73) | 26.5 (0.66) |
| | C | 16.0 (0.40) | 16.9 (0.43) | 18.7 (0.47) | 17.0 (0.43) | 10.2 (0.26) | 12.2 (0.31) | 12.6 (0.32) | 18.9 (0.47) | 19.0 (0.48) | 17.4 (0.44) |
| Life cycle (cycles) | | 535 | 524 | 570 | 560 | 490 | 480 | 310 | 340 | 280 | 390 |

*1: silica powder prepared by a wet method and having a specific gravity of 200 m2/g.
*2: Chemipearl M-200 (average particle size 5 μm) produced by Mitsui Petrochemical Industry Co., Ltd.
*3: The value in parentheses shows a ratio on the assumption that S is 1.
*4: Since the amount of the polyethylene powder mixed was large, the electrolyte could not be easily absorbed by a separator and flowed down along the surface thereof.

EXAMPLES 30 TO 37 AND COMPARATIVE EXAMPLES 27 TO 34

A separator for a storage battery was produced with each of the material compositions shown in FIGS. 9 and 10, and the various characteristics of the separators were measured. The results of measurement are shown in Tables 9 and 10. The results of overall evaluation on the basis of the measurement results are also shown in Tables 9 and 10 in which ×=poor and O=good.

TABLE 9

| | | Example | | | | | | | |
|---|---|---|---|---|---|---|---|---|---|
| Example | | 30 | 31 | 32 | 33 | 34 | 35 | 36 | 37 |
| Material (parts by weight) | | | | | | | | | |
| Glass fiber*1 | (0.5 μm) | | | | | | | | |
| | (0.6 μm) | | | | | 40 | 40 | 30 | 30 |
| | (0.7 μm) | | | | | | | | |
| | (0.8 μm) | 99.3 | 98.5 | 97.5 | 96.0 | | | | |
| | (2.5 μm) | | | | | 58.5 | | 68.5 | 58.5 |
| | (4.0 μm) | | | | | | 56.0 | | |
| | (19 μm) | | | | | | | | 10 |
| Wet silica powder*2 | | | | | | | | | |
| Polyethylene powder*3 | | 0.7 | 1.5 | 2.5 | 4.0 | 1.5 | 4.0 | 1.5 | 1.5 |
| Basic weight (g/m²) | | 153 | 147 | 152 | 151 | 174 | 176 | 173 | 180 |
| Thickness (mm) | | 1.09 | 1.07 | 1.09 | 1.11 | 1.09 | 1.10 | 1.10 | 1.11 |
| Density (g/cm³) | | 0.140 | 0.137 | 0.139 | 0.136 | 0.160 | 0.160 | 0.157 | 0.162 |
| Tensile strength (g/15 mm width) | | 538 | 530 | 500 | 380 | 390 | 230 | 255 | 230 |
| Electrolyte retention (g/cc) | | 1.2 | 1.0 | 0.8 | 0.7 | 1.2 | 1.2 | 1.2 | 1.2 |
| Liquid absorption (mm/5 min) | | 94 | 81 | 70 | 52 | 85 | 72 | 80 | 85 |
| Apparent density/ stacking pressure ($10^{-4}$ cm$^{-1}$) | | 1.34 | 1.42 | 1.59 | 1.68 | 1.79 | 1.80 | 1.82 | 1.78 |
| Dripping distance after 60 min (mm) | | 100 | 85 | 80 | 92 | 98 | 97 | 80 | 88 |
| Evaluation*4 | | o | o | o | o | o | o | o | o |

*1: The composition was the same as that of A shown in Table 1.
*2: silica powder prepared by a wet method and having a specific gravity of 200 m2/g.
*3: Chemipearl M-200 (average particle size 5 μm) produced by Mitsui Petrochemical Industry Co., Ltd.
*4: Evaluation
o: excellent

TABLE 10

| | | Comparative Example | | | | | | | |
|---|---|---|---|---|---|---|---|---|---|
| Example | | 27 | 28 | 29 | 30 | 31 | 32 | 33 | 34 |
| Material (parts by weight) | | | | | | | | | |
| Glass fiber*1 | (0.5 μm) | 100 | | | | | | | |
| | (0.6 μm) | | 100 | | | | | | 20 |
| | (0.7 μm) | | | 100 | | | | | |
| | (0.8 μm) | | | | 100 | 70 | 99.9 | 94.0 | |
| | (2.5 μm) | | | | | | | | 58.5 |
| | (4.0 μm) | | | | | | | | |

TABLE 10-continued

| Example | Comparative Example | | | | | | | |
|---|---|---|---|---|---|---|---|---|
| | 27 | 28 | 29 | 30 | 31 | 32 | 33 | 34 |
| (19 μm) | | | | | | | | 20 |
| Wet silica powder*2 | | | | | 30 | | | |
| Polyethylene powder*3 | | | | | | 0.1 | 6.0 | 1.5 |
| Basic weight (g/m²) | 156 | 153 | 154 | 154 | 189 | 154 | 167 | 172 |
| Thickness (mm) | 1.08 | 1.04 | 1.10 | 1.10 | 1.11 | 1.10 | 1.11 | 1.10 |
| Density (g/cm³) | 0.144 | 0.147 | 0.140 | 0.140 | 0.170 | 0.140 | 0.150 | 0.156 |
| Tensile strength (g/15 mm width) | 750 | 690 | 520 | 540 | 830 | 540 | 190 | 210 |
| Electrolyte retention (g/cc) | 1.1 | 1.2 | 1.4 | 1.6 | 1.1 | 1.4 | 0.5 | 1.2 |
| Liquid absorption (mm/5 min) | 65 | 95 | 120 | 120 | 65 | 108 | 36 | 120 |
| Apparent density/ stacking pressure (×10⁴) | 1.10 | 1.14 | 1.20 | 1.24 | 1.10 | 1.29 | 1.80 | 1.70 |
| Dripping distance after 60 min (mm) | 30 | 50 | 102 | 120 | 68 | 108 | *4 105 | 120 |
| Evaluation*5 | x | x | x | x | x | x | x | x |

*1: The composition was the same as that of A shown in Table 1.
*2: silica powder prepared by a wet method and having a specific gravity of 200 m2/g.
*3: Chemipearl M-200 (average particle size 5 μm) produced by Mitsui Petrochemical Industry Co., Ltd.
*4: Since the amount of the polyethylene powder mixed was large, the electrolyte could not be easily by a separator and flowed down along the surface thereof.
*5: Evaluation
x: poor The results shown in Tables 9 and 10 reveal the following:

The separator in the form (4) of the present invention has an excellent effect of preventing stratification and thus has a long life and excellent cycle life performance.

Since the separator also has an extremely high degree of electrolyte retention and a high value of apparent density/stacking pressure of $1.3 \times 10^{-4}$ or more, it can easily be incorporated into a valve regulated lead acid battery case. Since a separator having a high value of apparent density/stacking pressure has good elasticity, can easily be compressed when inserted into a battery case, and has excellent compressive force, it is suitable as a separator. As described above, since the separator of the present invention has good elasticity and is soft, the stacking pressure is absorbed even if many plates are stacked, and the separator can easily be inserted into a case of a valve regulated lead acid battery, without producing deviation in stacking pressure.

What is claimed is:

1. A sheet-like separator having an electrolyte dripping speed of 100 mm/hr, or less wherein the values of repellent force on the pouring repellent force curve of pouring of dilute sulfuric acid shown in FIG. 1 are the following:

if point S = P kg/dm²,
point B ≧ 0.55P kg/dm²
point C ≧ 0.40P kg/dm².

2. A sheet-like separator according to claim 1 having an electrolyte dripping speed of 80 mm/hr or less.

3. A sheet-like separator according to claim 1 substantially comprising glass fibers only.

4. A sheet-like separator according to claim 3 substantially comprising 40 to 60% by weight of fine glass fibers having an average fiber diameter of 0.4 to 0.7 μm, 20% by weight or less of medium-fine glass fibers having an average fiber diameter above 0.7 μm and less than 1.1 μm, 60 to 40% by weight of medium-thick glass fibers having an average fiber diameter of 1.1 to 5.0 μm, and 15% by weight or less of thick glass fibers having an average fiber diameter above 5.0 μm and 30 μm or less.

5. A sheet-like separator according to claim 4, substantially comprising 44 to 56% by weight of fine glass fibers having an average fiber diameter of 0.50 to 0.65 μm, 10% by weight or less of medium-fine glass fibers having an average fiber diameter above 0.65 μm and below 2.0 μm, 44 to 56% by weight of medium-thick glass fibers having an average fiber diameter of 2.0 to 4.5 μm and 10% by weight or less of thick glass fibers having an average fiber diameter above 4.5 μm and less than 30 μm.

6. A sheet-like separator according to claim 3, wherein said glass fibers are at least partially subjected to water repellent treatment.

7. A sheet-like separator according to claim 6, wherein said water repellent treatment is performed by a silane coupling agent.

8. A sheet-like separator according to claim 7, wherein an average ratio of the silane coupling agent adhering to the glass fibers subjected to water repellent treatment is 0.01 to 4.0% by weight.

9. A sheet-like separator according to claim 7, wherein the ratio of the glass fibers subjected to water repellent treatment is 5 to 100% by weight relative to the amount of the glass fibers which form said separator.

10. A sheet-like separator according to claim 6, wherein said glass fibers have an average fiber diameter of 2 μm or less.

11. A sheet-like separator according to claim 6, wherein said glass fibers comprise fine glass fibers having an average fiber diameter of 2 μm or less and thick glass fibers having an average fiber diameter above 2 μm, and said fine and/or thick glass fibers are partially or entirely are subjected to water repellent treatment.

12. A sheet-like separator according to claim 6, substantially comprising 40 to 60% by weight of fine glass fibers having an average fiber diameter of 0.4 to 0 7 μm, 20% by weight or less of medium-fine glass fibers having an average fiber diameter above 0.7 μm and less than 1.1 μm, 60 to 40% by weight of medium-thick glass fibers having an average fiber diameter of 1.1 to 5.0 μm, and 15% by weight or less of thick glass fibers having an average fiber diameter above 5.0 μm and 30 μm or less.

13. A sheet-like separator according to claim 12, substantially comprising 44 to 56% by weight of fine glass fibers having an average fiber diameter of 0.50 to 0.65 μm, 10% by weight or less of medium-fine glass fibers having an average fiber diameter above 0.65 μm and below 2.0 μm, 44 to 56% by weight of medium-thick glass fibers having an average fiber diameter of 2.0 to 4.5 μm and 10% by weight or less of thick glass fibers having an average fiber diameter above 4.5 μm and less than 30 μm.

14. A sheet-like separator according to claim 1, substantially comprising organic fibers and glass fibers.

15. A sheet-like separator according to claim 14, wherein said organic fibers are polypropylene fibers having an average fiber diameter of 2 to 20 μm and an average fiber length of 2 to 25 mm.

16. A sheet-like separator according to claim 14, substantially comprising 7 to 35% by weight organic fibers and 93 to 65% by weight glass fibers.

17. A sheet-like separator according to claim 14, wherein said glass fibers have an average fiber diameter of 2 μm or less.

18. A sheet-like separator according to claim 14, wherein said glass fibers comprise glass fibers having an average fiber diameter of 2 μm or less and glass fibers having an average fiber diameter above 2 μm.

19. A sheet-like separator according to claim 14, wherein said glass fibers comprise 40 to 60% by weight of fine glass fibers having an average fiber diameter of 0.4 to 0.7 μm, 20% by weight or less of medium-fine glass fibers having an average fiber diameter above 0.7 μm and less than 1.1 μm, 60 to 40% by weight of medium-thick glass fibers having an average fiber diameter of 1.1 to 5.0 μm, and 15% by weight or less of thick glass fibers having an average fiber diameter above 5.0 μm and 30 μm or less.

20. A sheet-like separator according to claim 19, wherein said glass fibers comprise 44 to 56% by weight of fine glass fibers having an average fiber diameter of 0.50 to 0.65 μm, 10% by weight or less of medium-fine glass fibers having an average fiber diameter above 0.65 μm and below 2.0 μm, 44 to 56% by weight of medium-thick glass fibers having an average fiber diameter of 2.0 to 4.5 μm and 10% by weight or less of thick glass fibers having an average fiber diameter above 4.5 μm and less than 30 μm.

21. A sheet-like separator according to claim 1, comprising glass fibers as a main component and 0.5 to 5.0% by weight polyethylene powder.

22. A sheet-like separator according to claim 21, wherein said glass fibers comprise 25 to 60% by weight of fine glass fibers having an average fiber diameter of 0.4 to 0.7 μm, 0 to 20% by weight of medium-fine glass fibers having an average fiber diameter above 0.7 μm and less than 1.1 μm, 75 to 40% by weight of medium-thick glass fibers having an average fiber diameter of 1.1 to 5.0 μm, and 0 to 15% by weight of thick glass fibers having an average fiber diameter above 5.0 μm and 30 μm or less.

23. A sheet-like separator according to claim 22, wherein said glass fibers comprise 24 to 56% by weight of fine glass fibers having an average fiber diameter of 0.50 to 0.65 μm, 0 to 10% by weight of medium-fine glass fibers having an average fiber diameter above 0.65 μm and below 2.0 μm, 71 to 36% by weight of medium-thick glass fibers having an average fiber diameter of 2.0 to 4.5 μm and 0 to 10% by weight of thick glass fibers having an average fiber diameter above 4.5 μm and less than 30 μm.

24. A valve regulated lead acid battery using a sheet-like separator according to claim 1.

* * * * *